US012736158B2

(12) United States Patent
Hou et al.

(10) Patent No.: US 12,736,158 B2
(45) Date of Patent: Sep. 15, 2026

(54) ASSEMBLY OF RESIN PIPE AND METAL MEMBER AND METHOD OF MANUFACTURING ASSEMBLY

(71) Applicant: THE YOKOHAMA RUBBER CO., LTD., Hiratsuka (JP)

(72) Inventors: Gang Hou, Hiratsuka (JP); Nobuaki Kuribayashi, Hiratsuka (JP)

(73) Assignee: The Yokohama Rubber Co., Ltd., Kanagawa (JP)

( * ) Notice: Subject to any disclaimer, the term of this patent is extended or adjusted under 35 U.S.C. 154(b) by 0 days.

(21) Appl. No.: 18/691,723

(22) PCT Filed: Jun. 30, 2022

(86) PCT No.: PCT/JP2022/026296
§ 371 (c)(1),
(2) Date: Mar. 13, 2024

(87) PCT Pub. No.: WO2023/058280
PCT Pub. Date: Apr. 13, 2023

(65) Prior Publication Data

US 2024/0384820 A1 Nov. 21, 2024

(30) Foreign Application Priority Data

Oct. 7, 2021 (JP) ................................ 2021-165569

(51) Int. Cl.
*F16L 25/00* (2006.01)
*F16L 21/02* (2006.01)
(Continued)

(52) U.S. Cl.
CPC ........... *F16L 25/0072* (2013.01); *F16L 21/02* (2013.01); *F16L 21/035* (2013.01); *F16L 47/32* (2013.01)

(58) Field of Classification Search
CPC ... F16L 25/0072; F16L 25/0054; F16L 25/10; F16L 21/02; F16L 21/035; F16L 47/24; F16L 47/28; F16L 47/32
See application file for complete search history.

(56) References Cited

U.S. PATENT DOCUMENTS 3,245,701 A * 4/1966 Leopold, Jr. ............ F16L 15/08 285/239
3,791,679 A 2/1974 Glover
(Continued)

FOREIGN PATENT DOCUMENTS

JP S51-2734 U 1/1976
JP H05-141582 A 6/1993
(Continued)

*Primary Examiner* — David Bochna
(74) *Attorney, Agent, or Firm* — Carrier, Shende & Associates; Joseph P. Carrier; Fulchand P. Shende

(57) ABSTRACT

A cylindrical shaped circumferential rib is integrally formed as a base protruding on the outer circumferential surface of a resin pipe. An annular sealant is externally fitted on one end portion of a metal member which is inserted in and fixed to the base to interpose the sealant between the one end portion and the inner circumferential surface of the base, allow the outer circumferential surface of the one end portion to press and restrict the movement of the sealant toward the inner side in the radial direction and toward the trailing end side of the one end portion in the insertion direction, and allow the inner circumferential surface of the base to press and restrict the movement of the sealant toward the outer side in the radial direction and toward the insertion direction distal end side of the one end portion.

10 Claims, 7 Drawing Sheets

(51) Int. Cl.
*F16L 21/035* (2006.01)
*F16L 47/32* (2006.01)

(56) References Cited

U.S. PATENT DOCUMENTS 4,537,426 A * 8/1985 Carter, Sr. ............... F16L 47/16 285/133.4
4,609,210 A * 9/1986 Torokvei ............... F16L 21/065 285/423
4,682,797 A * 7/1987 Hildner ................... F16L 47/16 285/21.2
5,120,153 A * 6/1992 Valls ....................... F16L 21/03 285/345
5,429,398 A * 7/1995 Lupke ..................... F16L 47/08 285/915
5,551,734 A 9/1996 Sulzyc et al.
6,764,102 B2 * 7/2004 Ezura .................. F16L 37/0926 285/903
8,109,540 B2 * 2/2012 Zepp ................... B29C 66/4324 285/903
8,746,746 B1 * 6/2014 Schafer ................... F16L 47/32 285/133.11
8,967,674 B2 * 3/2015 Douglass, III .......... B29C 33/42 285/133.5
10,550,972 B2 * 2/2020 Goble ................... F16L 21/007
10,562,212 B2 * 2/2020 Sutton ................. B29C 45/2612
11,426,909 B2 * 8/2022 Kaschka ................. F16L 47/24
2005/0161947 A1 * 7/2005 Skinner ................... F16L 21/03 285/903
2006/0131872 A1 * 6/2006 Roig ....................... F16L 41/02 285/133.5

FOREIGN PATENT DOCUMENTS

JP 2003-278990 A 10/2003
JP 2004-268117 A 9/2004
JP 2018-132078 A 8/2018
JP 2021-050793 A 4/2021
WO 2011/023888 A1 3/2011

* cited by examiner

ASSEMBLY OF RESIN PIPE AND METAL MEMBER AND METHOD OF MANUFACTURING ASSEMBLY

TECHNICAL FIELD

The present invention relates to an assembly of a resin pipe and a metal member and a method of manufacturing the assembly and particularly relates to an assembly that can provide ensured sealing properties of a connection portion between the resin pipe and the metal member and increased durability of the resin pipe at this connection portion and to a method of manufacturing the assembly.

BACKGROUND ART

Metal sensors that detect a pressure and a temperature of a fluid flowing in a pipe, metal joints, valves, and the like may be connected in the middle of the pipe in the longitudinal direction (for example, see Patent Literature 1). Thus, a base for connecting such a metal member is disposed projecting on the outer circumferential surface of the pipe.

In recent years, resin pipes may be adopted as pipes for weight reduction. A resin base integrated with the resin pipe is likely to be more deformed than the metal member and thus involves a higher risk of compromising sealing properties due to a gap generated in the connection portion between the pipe and the metal member over time. In addition, excessive stress may be likely to be applied to the resin base in the connection portion between the pipe and the metal member, leading to damage. Therefore, there is a room for improvement to increase durability of the resin pipe at the connection portion between the resin pipe and the metal member while ensuring sealing properties at this connection portion.

CITATION LIST

Patent Document

Patent Document 1: JP 2004-268117 A

SUMMARY OF INVENTION

Technical Problem

An object of the present invention is to provide an assembly that can provide ensured sealing properties of a connection portion between a resin pipe and a metal member and increased durability of the resin pipe at this connection portion and a method of manufacturing the assembly.

Solution to Problem

To achieve the object described above, an assembly of a resin pipe and a metal member of the present invention in which one end portion of the metal member is inserted in and fixed to a base having a cylindrical shape, made of resin, and protruding on an outer circumferential surface of the resin pipe includes a sealant externally fitted to the one end portion, interposed between an outer circumferential surface of the one end portion and an inner circumferential surface of the base, and having an annular shape. The outer circumferential surface of the one end portion pressing the sealant restricts movement of the sealant toward an inner side in a radial direction and toward a trailing end side of the one end portion in an insertion direction. The inner circumferential surface of the base pressing the sealant restricts movement of the sealant toward an outer side in the radial direction and toward a leading end side of the one end portion in the insertion direction. An outer circumferential surface of a portion of the base where the one end portion is inserted is provided with a circumferential rib that protrudes toward an outer circumferential side and is continuous around an entire circumference in a circumferential direction.

A method of manufacturing an assembly of a resin pipe and a metal member in which one end portion of the metal member is inserted in and fixed to a base having a cylindrical shape, made of resin, and protruding on an outer circumferential surface of the resin pipe of the present invention includes: integrally forming, as the base, a circumferential rib that protrudes toward an outer circumferential side and is continuous around an entire circumference in a circumferential direction on an outer circumferential surface of a portion of the base where the one end portion is inserted; and inserting and fixing the one end portion on which a sealant having an annular shape is externally fitted in and to the base to interpose the sealant between an outer circumferential surface of the one end portion and an inner circumferential surface of the base, allow the outer circumferential surface of the one end portion to press the sealant to restrict movement of the sealant toward an inner side in a radial direction and toward a trailing end side of the one end portion in an insertion direction, and allow the inner circumferential surface of the base to press the sealant to restrict movement of the sealant toward outer side in the radial direction and toward a leading end side of the one end portion in the insertion direction.

Advantageous Effects of Invention

According to the present invention, the sealant having an annular shape and interposed between the outer circumferential surface of the one end portion and the inner circumferential surface of the base is pressed by the outer circumferential surface of the one end portion to restrict the movement of the sealant toward the inner side in the radial direction and toward the trailing end side of the one end portion in the insertion direction and is pressed by the inner circumferential surface of the base to restrict the movement of the sealant toward the outer side in the radial direction and toward the leading end side of the one end portion in the insertion direction. This sealant allows sealing properties at the connection portion between the resin pipe and the one end portion of the metal member to be sufficiently ensured. The circumferential rib is provided on the outer circumferential surface of the portion of the base where the one end portion is inserted. Thus, stress produced in the base at the connection portion between the pipe and the metal member is reduced by the circumferential rib. As a result, this is advantageous for increasing the durability of the resin pipe (the base) at the connection portion between the pipe and the metal member.

DESCRIPTION OF EMBODIMENTS

Figure 1:
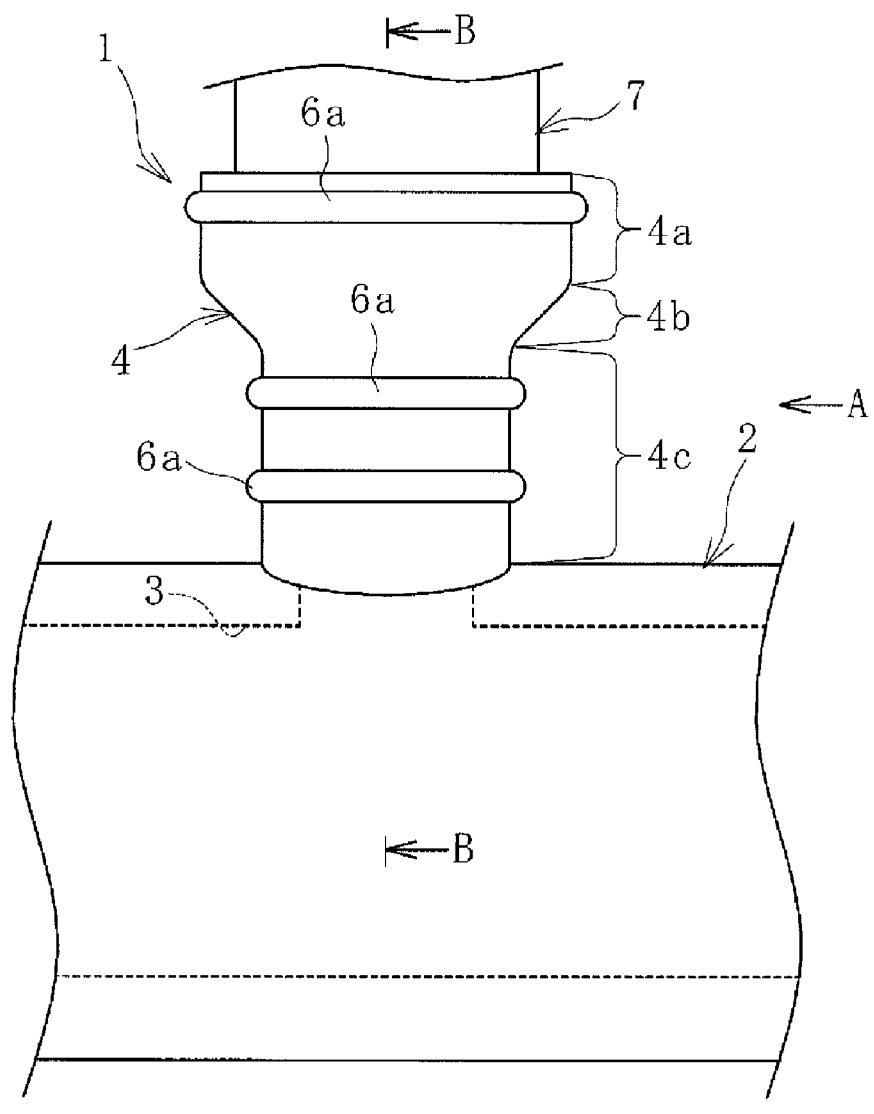
FIG. 1 is an explanatory diagram illustrating an embodiment of an assembly of a resin pipe and a metal member in a front view.

An assembly of a resin pipe and a metal member and a method of manufacturing the assembly of the present invention will be described below based on an embodiment illustrated in the drawings.

Figure 2:
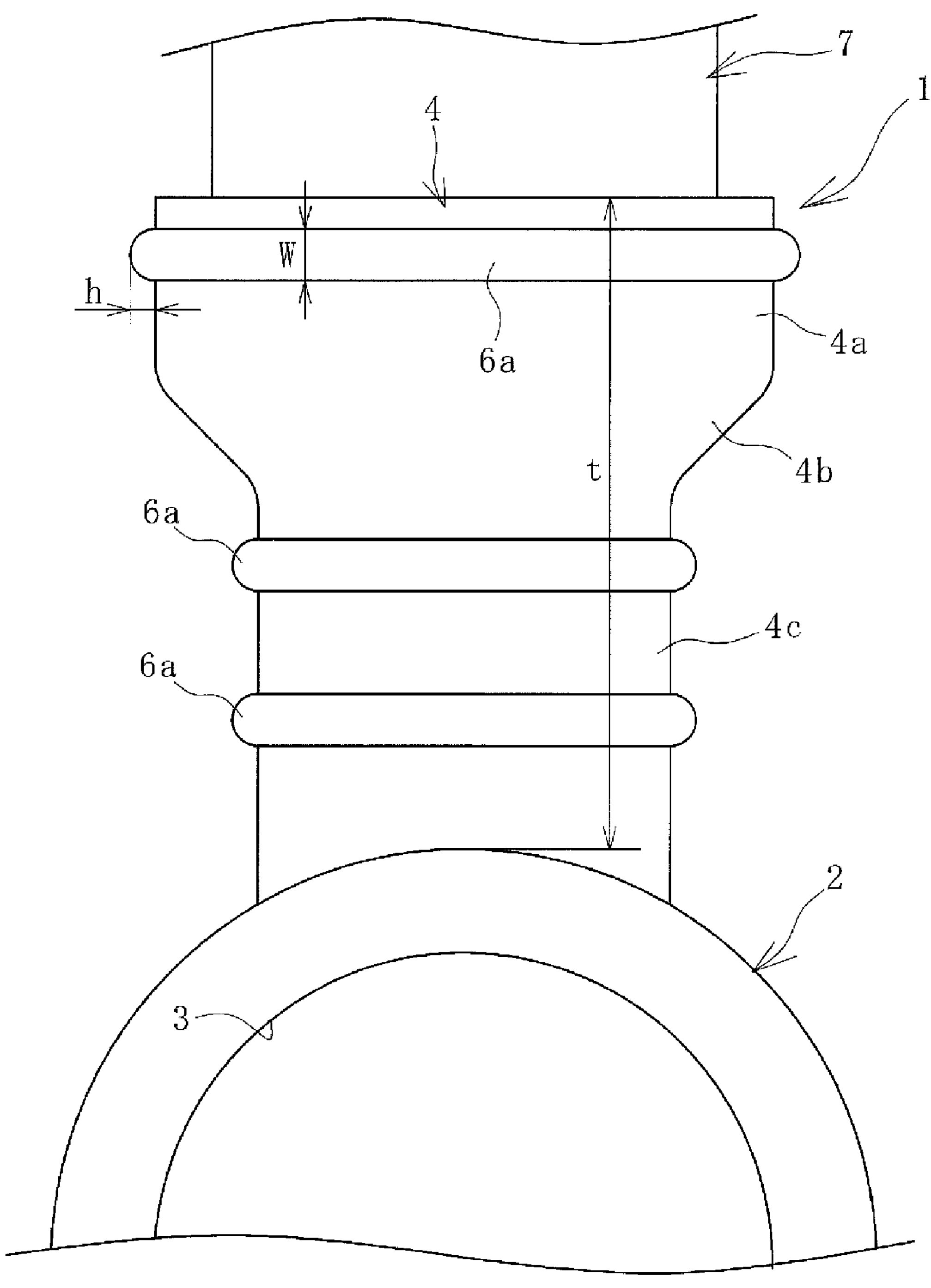
FIG. 2 is a view in the direction of arrows A in FIG. 1.
Figure 3:
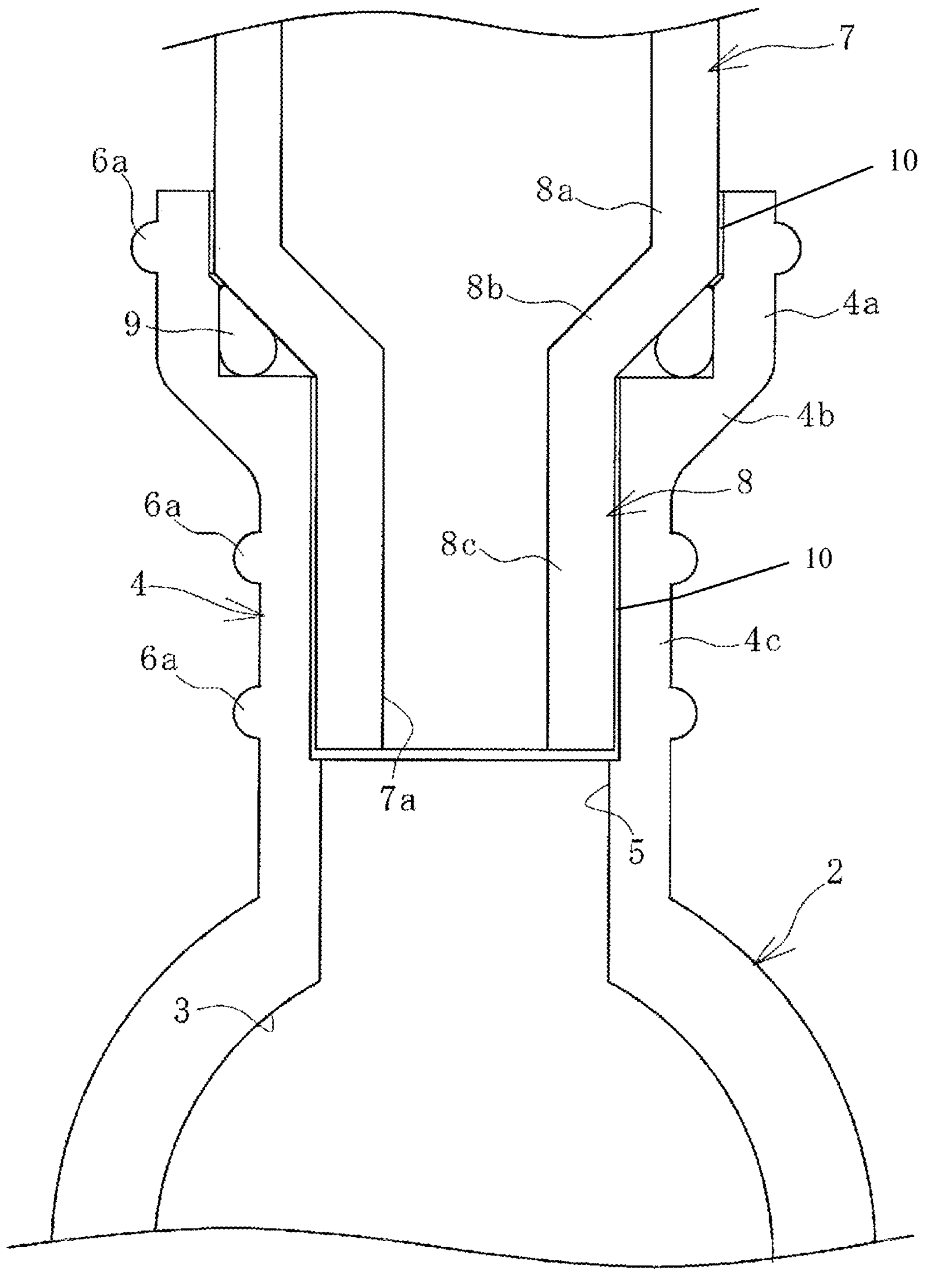
FIG. 3 is a cross-sectional view taken along B-B in FIG. 1.

As illustrated in FIGS. 1 to 3 as an example, an embodiment of an assembly 1 manufactured according to the present invention is obtained by connecting and integrating a resin pipe 2 and a metal member 7. The resin pipe 2 is a straight pipe in the present embodiment, but may be a bent pipe. The resin pipe 2 has an outer diameter of, for example, about 6 mm or more and 150 mm or less, and an inner diameter of, for example, about 4 mm or more and 146 mm or less.

One end portion 8 of the metal member 7 such as a metal sensor, a metal joint, or a valve is inserted into a base 4 formed at an intermediate position of the resin pipe 2 in the longitudinal direction, to be connected to the resin pipe 2. Sealing properties between the resin pipe 2 (the base 4) and the one end portion 8 are ensured by an annular sealant 9 interposed between the outer circumferential surface of the one end portion 8 and the inner circumferential surface of the base 4. The lower side in the drawing is defined as a leading end side of the one end portion 8 in an insertion direction of the metal member 7 (hereinafter, referred to as a leading end side of the one end portion in the insertion direction), and the upper side in the drawing is defined as a trailing end side of the one end portion 8 in the insertion direction (hereinafter, referred to as a trailing end side of the one end portion in the insertion direction).

The structure of the assembly 1 will be described in detail below.

As illustrated in FIG. 3 as an example, the resin pipe 2 has a pipe passage 3 extending through the resin pipe 2 in the longitudinal direction, and a base flow path 5 extending in the protruding direction of the base 4 is branched from an intermediate portion of the pipe passage 3. The base flow path 5 is open at the protruding end of the base 4. A protruding height t of the base 4 from the outer circumferential surface of the resin pipe 2 is, for example, about 1 mm or more and 30 mm or less.

The base 4 has a shape in which a base large-diameter portion 4*a*, a base enlarged-diameter portion 4*b*, and a base small-diameter portion 4*c* are continuously connected in this order from the protruding end side. The outer diameter of the base enlarged-diameter portion 4*b* gradually increases from the base small-diameter portion 4*c* toward the base large-diameter portion 4*a*.

A step having a flat surface that is parallel to the radial direction (lateral direction in the figure) of the base 4 and is continuous around the entire circumference in the circumferential direction is formed in the inner circumferential surface of the base 4. The sealant 9 made of rubber or elastomer, such as an O-ring is disposed on the flat surface of the step. More specifically, the step in which the sealant 9 is disposed is formed in the vicinity of the boundary between the base large-diameter portion 4*a* and the base enlarged-diameter portion 4*b*, and different steps are formed respectively at positions above and below the step. Specifically, on the inner circumferential surface of the base 4, a step is formed at each of a position corresponding to the vicinity of the boundary between a large-diameter portion 8*a* and an enlarged-diameter portion 8*b* of the one end portion 8 to be described later, a position corresponding to the vicinity of the boundary between the enlarged-diameter portion 8*b* and a small-diameter portion 8*c*, and a position corresponding to the vicinity of the leading end of the small-diameter portion 8*c*.

The base 4 has, on its outer circumferential surface, circumferential ribs 6*a* that protrude toward the outer circumferential side and continuing around the entire circumference in the circumferential direction. In the present embodiment, three circumferential ribs 6*a* are disposed at an interval in the cylinder axial direction of the base 4. Specifically, one circumferential rib 6*a* is provided to the base large-diameter portion 4*a*, and two circumferential ribs 6*a* are provided to the base small-diameter portion 4*c*.

At least one circumferential rib 6*a* may be provided to each of the base large-diameter portion 4*a*, the base enlarged-diameter portion 4*b*, and the base small-diameter portion 4*c*. The number of the circumferential ribs 6*a* is, for example, about one to five, but it is preferable that at least one circumferential rib 6*a* is disposed to a protruding opening end portion of the base 4. At least one circumferential rib 6*a* is disposed on the outer circumferential surface of the portion of the base 4 where the one end portion 8 is inserted. Each circumferential rib 6*a* is preferably disposed on the outer circumferential surface of the portion of the base 4 where the one end portion 8 is inserted.

A protrusion amount h of each circumferential rib 6*a* from the outer circumferential surface of the base 4 toward the outer circumferential side is preferably 1 mm or more, and is, for example, 1 mm or more and 10 mm or less. A width W of each circumferential rib 6*a* is 1 mm or more and 10 mm or less for example.

The cross-sectional shape of the circumferential rib 6*a* is not limited to a semicircular shape as in the present embodiment, and a triangular shape, a quadrangular shape, other polygonal shapes, or the like can be employed. However, it is preferable that the cross-sectional shape of the circumferential rib 6*a* is a shape having no corner portion, and such a cross-sectional shape is advantageous for increasing the durability of the circumferential rib 6*a*.

As resin forming the resin pipe 2, various known types of resin such as nylon resin (such as 66 nylon), polypropylene, and an ABS resin are used. The type (specification) of the resin used for the resin pipe 2 is determined based on the performance required for the resin pipe 2. For example, resin having excellent durability against the fluid flowing in the pipe passage 3 and excellent durability against external impact, abrasion, ultraviolet rays, and the like is used.

When the resin pipe 2 requires high pressure resistance, short fibers (such as, for example, glass fibers or carbon fibers) for reinforcement are mixed with the resin at a predetermined ratio (for example, 30 mass % or more and 40 mass % or less with respect to 100 parts by mass of the resin). The short fibers are sized to have, for example, an outer diameter of about 0.001 mm or more and 1.0 mm or less and a length of about 0.01 mm or more to 10 mm or less.

The metal member 7 has a flow path 7*a* extending therethrough in the longitudinal direction (insertion direction), and the flow path 7*a* is open at the leading end of the one end portion 8 in the insertion direction. The one end portion 8 has a shape in which the small-diameter portion 8*c* on the leading end side in the insertion direction, the large-diameter portion 8*a* on the trailing end side in the insertion direction, and the enlarged-diameter portion 8*b* whose outer diameter gradually increases from the small-diameter portion 8*c* toward the large-diameter portion 8*a* are continuously connected. The small-diameter portion 8*c*, the enlarged-diameter portion 8*b*, and the large-diameter portion 8*a* respectively correspond to the base small-diameter portion 4*c*, the base enlarged-diameter portion 4*b*, and the base large-diameter portion 4*a*.

The metal member 7 is fixed to the resin pipe 2, with the inner circumferential surface of the base small-diameter portion 4*c* and the outer circumferential surface of the one end portion 8 facing and screwed to each other. The flow path 7*a* and the pipe passage 3 communicate with each other through the base flow path 5.

In the assembly 1, the outer circumferential surface of the one end portion 8 (the outer circumferential surface of the enlarged-diameter portion 8*b*) that presses the sealant 9, restricts the movement of the sealant 9 toward the inner side in the radial direction and toward the trailing end side of the one end portion in the insertion direction. Furthermore, the inner circumferential surface of the base 4 that presses the sealant 9 restricts movement of the sealant 9 toward the outer side in the radial direction and the leading end side of the one end portion in the insertion direction.

The outer circumferential surface of the one end portion 8 is not limited to the shape described as an example in the present embodiment and has any shape allowing the movement of the sealant 9 toward the inner side in the radial direction and toward the trailing end side of the one end portion in the insertion direction to be restricted. The inner circumferential surface of the base 4 is not limited to the shape described as an example in the present embodiment and has any shape allowing the movement of the sealant 9 toward the outer side in the radial direction and toward the leading end side of the one end portion in the insertion direction to be restricted. For example, instead of having the enlarged-diameter portion 8*b*, the one end portion 8 may have a shape with an outer circumferential surface extending in parallel to the radial direction (lateral direction in the figure) of the base 4 the diameter of which increases from the small-diameter portion 8*c* toward the large-diameter portion 8*a*.

An example of a procedure of a method of manufacturing the assembly 1 of the present invention will be described below.

Figure 4:
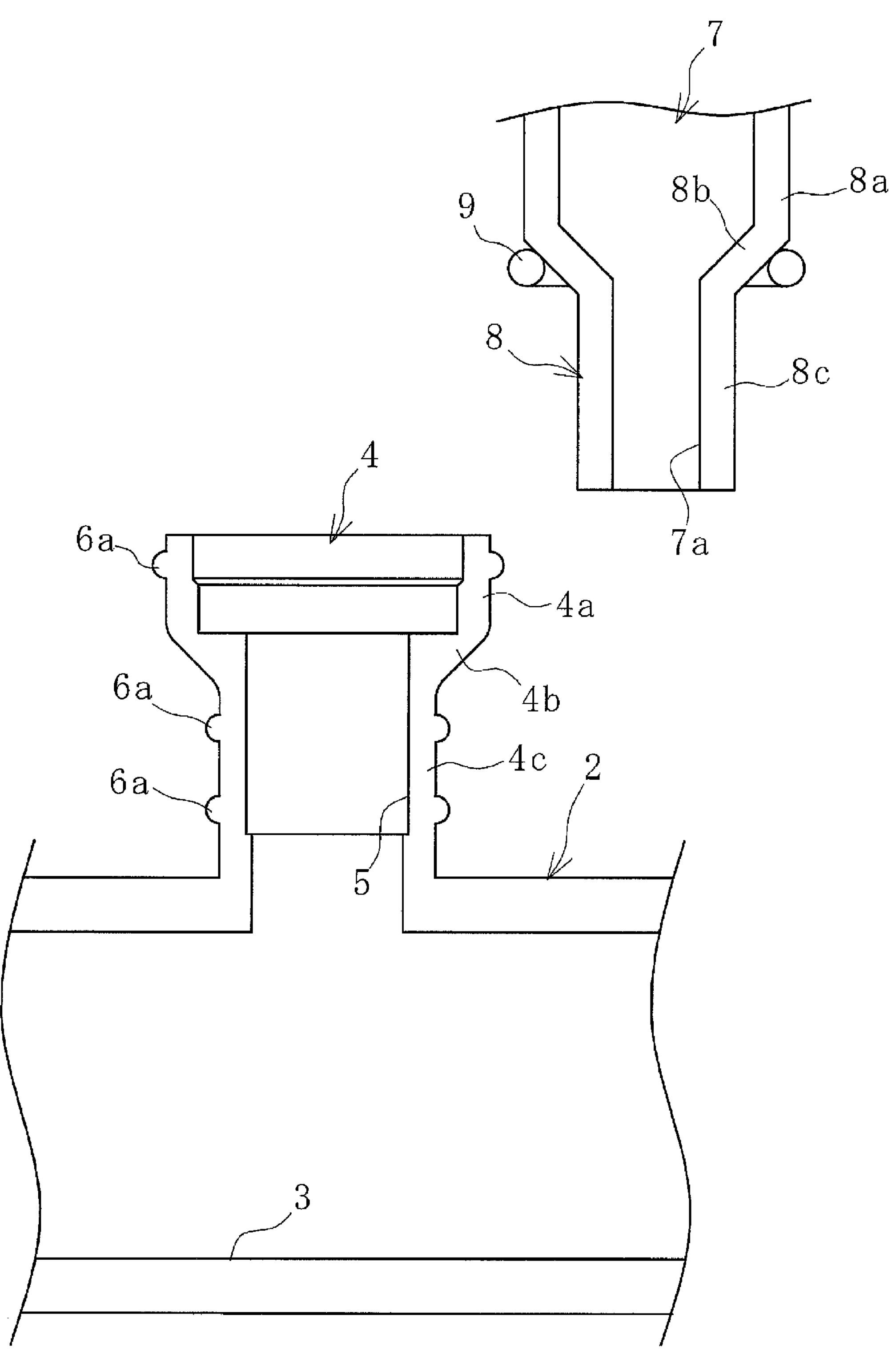
FIG. 4 is an explanatory diagram illustrating a state in which the resin pipe and the metal member in FIG. 1 are separated from each other in a cross-sectional view.

To manufacture the assembly 1 illustrated in FIGS. 1 to 3 as an example, the resin pipe 2 and the metal member 7 are prepared as illustrated in FIG. 4. The resin pipe 2 is manufactured by a known molding method such as injection molding for example. The base 4 is integrally manufactured as part of the resin pipe 2. Therefore, the circumferential rib 6*a* is also formed integrally with the resin pipe 2 (the base 4). Thus, when the entire resin pipe 2 is basically made of the same plastic material mixed with short fibers, the short fibers are mixed not only in a circumferential wall portion of the pipe passage 3 of the resin pipe 2 but are also mixed in the base 4 and the circumferential rib 6*a*. In the outer circumferential surface of the portion of the base 4 where the one end portion 8 is inserted, the circumferential rib 6*a* is integrally formed as the base 4.

Figure 5:
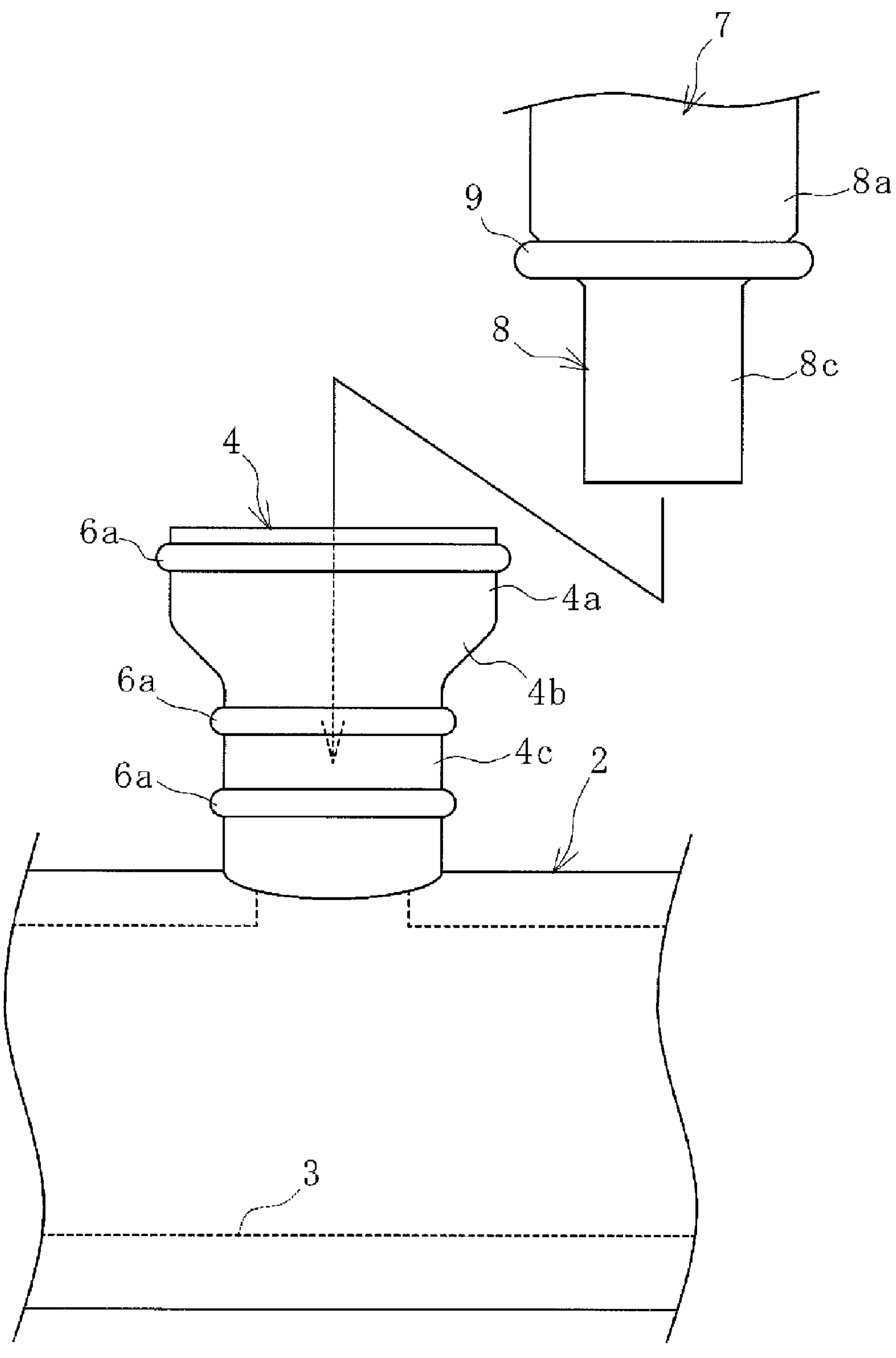
FIG. 5 is an explanatory diagram illustrating a step of connecting the resin pipe and the metal member in FIG. 4 in a front view.

Next as illustrated in FIG. 5 as an example, the one end portion 8 of the metal member 7 to which the sealant 9 is externally fitted is inserted into the tubular base 4. The one end portion 8 and the base 4 are connected and fixed to each other as illustrated in FIG. 3 as an example, by inserting the one end portion 8 into the base 4 for a predetermined length with screw parts 10 of the outer circumferential surface of the one end portion 8 and the inner circumferential surface of the base 4 screwed to each other.

In the assembly 1, the sealant 9 interposed between the outer circumferential surface of the one end portion 8 and the inner circumferential surface of the base 4 is pressed by the outer circumferential surface of the one end portion 8. Thus, the movement of the sealant 9 toward the inner side in the radial direction and toward the trailing end side of the one end portion in the insertion direction is restricted. The sealant 9 is pressed by the inner circumferential surface of the base 4, and thus the movement of the sealant 9 toward the outer side in the radial direction and toward the leading end side of the one end portion in the insertion direction is restricted. Thus, the movement of the pressed sealant 9 is restricted in directions surrounded by four sides in cross section, whereby the sealing properties of the connection portion between the resin pipe 2 and the one end portion 8 is sufficiently ensured by the sealant 9.

While the inner circumferential surface of the base 4 is pressed by the sealant 9 pressed by the one end portion 8, the sealant 9 is pressed by the outer circumferential surface (inclined surface) of the enlarged-diameter portion 8*b* as in the present embodiment. Therefore, the inner circumferential surface of the base 4 is prevented from being excessively pressed toward the outer side in the radial direction or the leading end side of the one end portion in the insertion direction. This is advantageous for preventing the excessive stress from being concentrated on the base 4. The inclination angle of the enlarged-diameter portion 8*b* with respect to the extending direction (vertical direction in the figure) of the one end portion 8 may be, for example, 30° or more and 60° or less (about 45°).

Normally, excessive stress is likely to be produced at the portion of the base 4 where the one end portion 8 is inserted. Still, since the assembly 1 has the circumferential rib 6*a* on the outer circumferential surface of this portion, the stress produced in the base 4 at the connection portion therebetween is reduced by the circumferential rib 6*a*. As a result, this is advantageous for increasing the durability of the resin pipe 2 (the base 4) at the connection portion therebetween.

The protruding opening end portion of the base 4 is a free end where particularly large stress is likely to be produced, and thus is likely to be a position in the base 4 where the maximum stress is produced. Therefore, by providing the circumferential rib 6*a* in this portion, the stress is dispersed in this portion. Thus, the maximum stress produced in the base 4 can be reduced to, for example, 50% or less.

As in the present embodiment, it is preferable that the protruding opening end portion of the base 4 is located at a position higher than the upper end of the sealant 9 by a certain distance (for example, a 5 mm or more). Thus separating the protruding opening end portion from the sealant 9 is advantageous for reducing the stress produced at the protruding opening end portion of the base 4, and is also advantageous for suppressing deformation or damage of the protruding opening end portion.

While the service life of the resin pipe 2 tends to be shorter under the condition that the working internal pressure of the resin pipe 2 is 30 MPa or more, a long service life can be achieved by applying the present invention. An example of the resin pipe 2 with a working internal pressure of 3.5 MPa or more (or 30 MPa or more) is a pipe through which a refrigerant of an air conditioner mounted on an automobile flows.

The resin pipe 2 (the base 4) being too stiff is disadvantageous in terms of suppression of damage over time, and thus appropriate flexibility is required. Therefore, preferably, the resin pipe 2 (the base 4) is formed of, for example, 66 nylon and short fibers are mixed for reinforcement.

Figure 6:
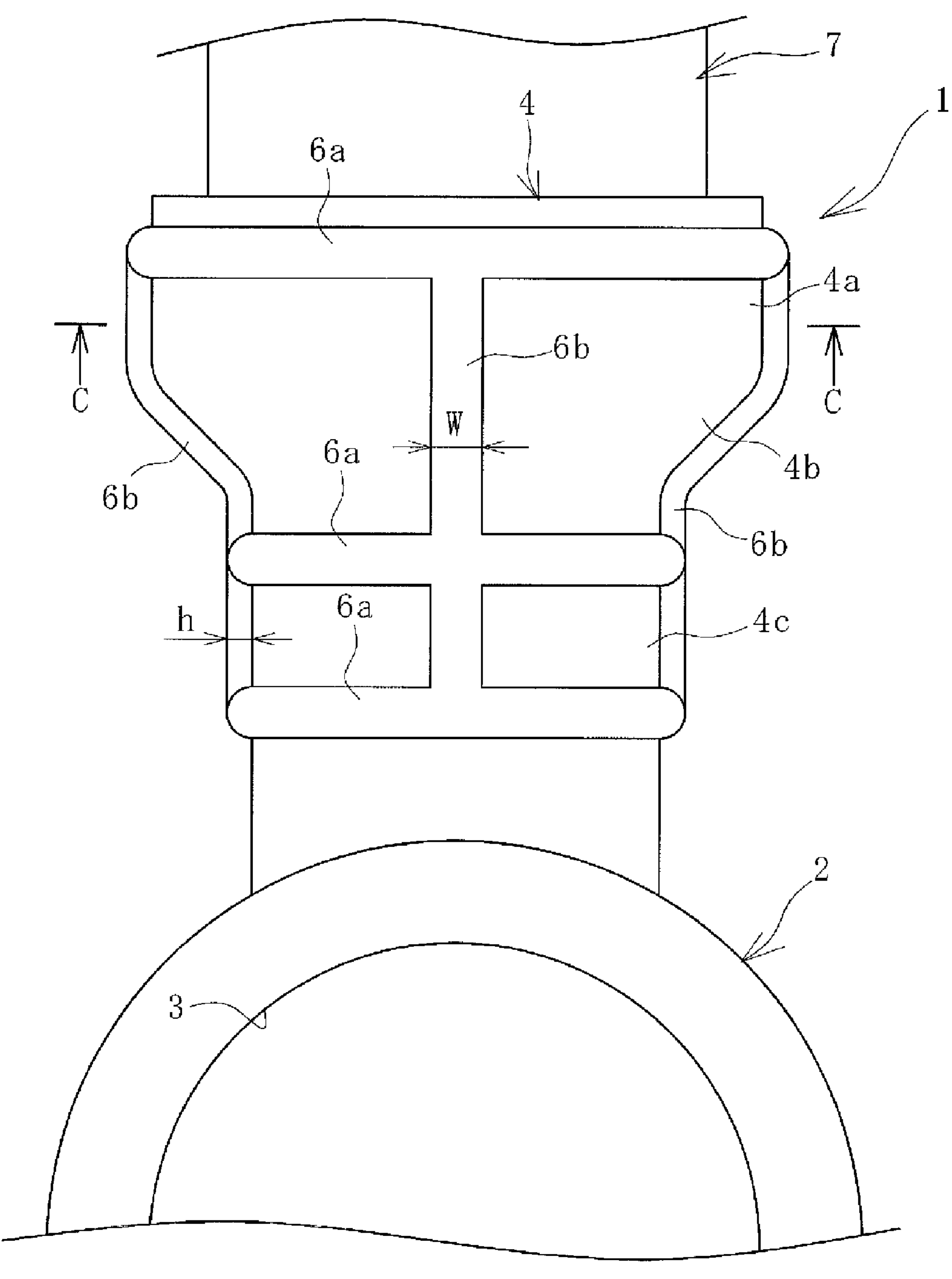
FIG. 6 is an explanatory diagram illustrating another embodiment of the assembly in a side view.
Figure 7:
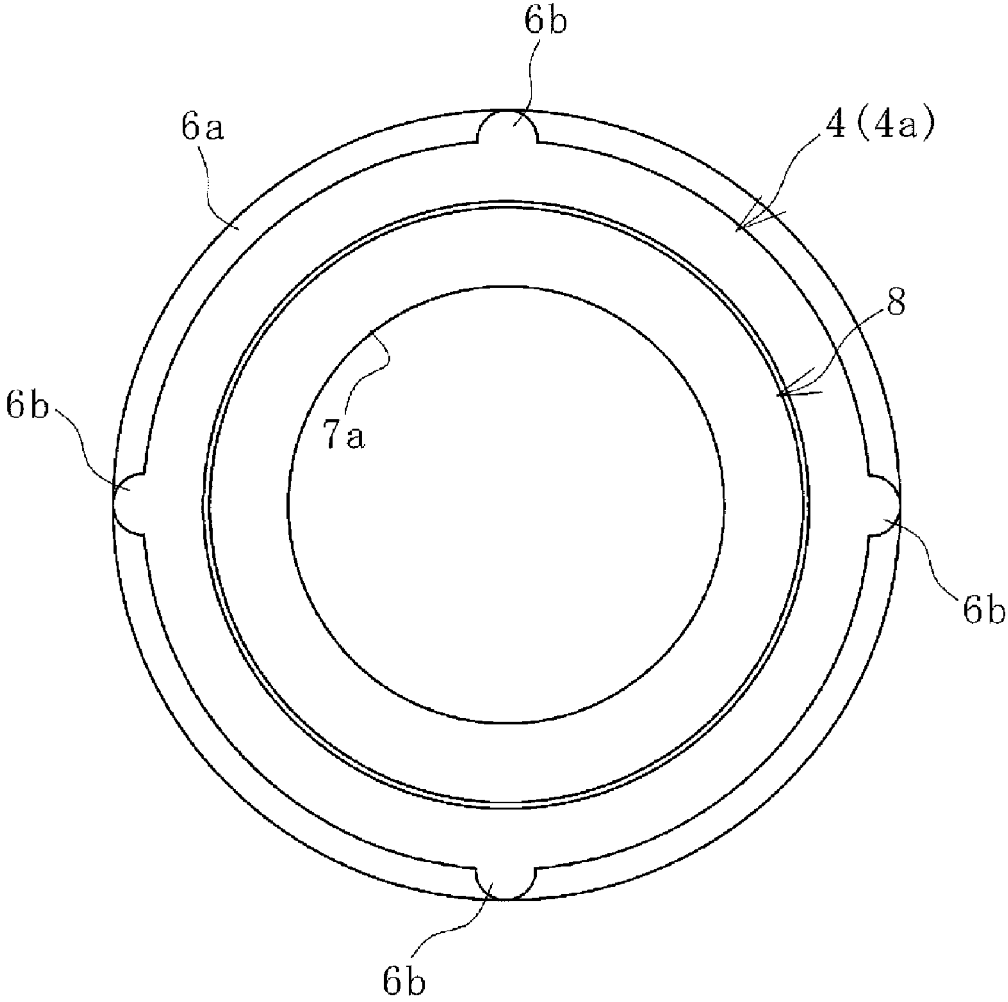
FIG. 7 is a cross-sectional view along line C-C in FIG. 6.

As in another embodiment of the assembly 1 illustrated in FIGS. 6 and 7 as an example, in addition to the circumferential rib 6*a*, a vertical rib 6*b* that is continuously connected to the circumferential rib 6*a* and extends in the cylinder axial direction of the base 4 may be provided. At least three vertical ribs 6*b* are separately disposed at an equal interval in the circumferential direction of the base 4. For example, four or more and twelve or less vertical ribs 6*b* are disposed at an equal interval in the circumferential direction.

The vertical ribs 6*b* are set to have substantially the same specification. The vertical rib 6*b* preferably extends over the entire length of the portion of the base 4 where the one end portion 8 of the base 4 is inserted. The protrusion amount h of the vertical rib 6*b* from the outer circumferential surface of the base 4 toward the outer circumferential side is preferably 2 mm or more and may be equal to or smaller than the protrusion amount h of the circumferential rib 6*a*. The width W of the vertical rib 6*b* is substantially equal to the width W of the circumferential rib 6*a*.

The specification in which the vertical rib 6*b* described above is provided in addition to the circumferential rib 6*a* is advantageous in further improving the durability of the resin pipe 2 (base 4). As a result, it is more advantageous to ensure the sealing properties of the connection portion between the resin pipe 2 (the base 4) and the one end portion 8 of the metal member 7.

REFERENCE SIGNS LIST

- 1 Assembly
- 2 Resin pipe
- 3 Pipe passage
- 4 Base
- 4*a* Base large-diameter portion
- 4*b* Base enlarged-diameter portion
- 4*c* Base small-diameter portion
- 5 Base flow path
- 6*a* Circumferential rib
- 6*b* Vertical rib
- 7 Metal member
- 7*a* Flow path
- 8 One end portion
- 8*a* Large-diameter portion
- 8*b* Enlarged-diameter portion
- 8*c* Small-diameter portion
- 9 Sealant

The invention claimed is:

1. An assembly of a resin pipe and a metal member in which one metal end portion of the metal member is inserted in and fixed to a base having a cylindrical shape, made of resin, and protruding on an outer circumferential surface of the resin pipe at an intermediate position of the resin pipe in the pipe's longitudinal direction, the assembly comprising a base flow path extending in a protruding direction of the base being branched from an intermediate portion of a pipe passage of the resin pipe and the base flow path is configured to be open at the protruding end of the base, a sealant externally fitted to the one metal end portion, interposed between a metal outer circumferential surface of the one metal end portion and a resin inner circumferential surface of the base, and having an annular shape, the metal outer circumferential surface of the one metal end portion pressing the sealant being configured to restrict movement of the sealant toward an inner side in a radial direction and toward a trailing end side of the one metal end portion in an insertion direction, the resin inner circumferential surface of the base pressing the sealant being configured to restrict movement of the sealant toward an outer side in the radial direction and toward a leading end side of the one metal end portion in the insertion direction, and a resin outer circumferential surface of a portion of the base where the one metal end portion is inserted being provided with a resin circumferential rib that protrudes toward an outer circumferential side and is continuous around an entire circumference in a circumferential direction, wherein the one metal end portion is a shape in which a small-diameter portion on the leading end side in the insertion direction, a large-diameter portion on the trailing end side in the insertion direction, and an enlarged-diameter portion whose outer diameter gradually increases from the small-diameter portion toward the large-diameter portion are continuously connected, the base comprises a base small-diameter portion corresponding to the small-diameter portion, a base large-diameter portion corresponding to the large-diameter portion, and a base enlarged-diameter portion corresponding to the enlarged-diameter portion, and an outer circumferential surface of the enlarged-diameter portion presses the sealant to restrict movement of the sealant toward the inner side in the radial direction and toward the trailing end side of the one metal end portion in the insertion direction.

2. The assembly according to claim 1, wherein more than one said resin circumferential rib is provided with the resin outer circumferential surface of the portion of the base and at least one of the resin circumferential ribs is disposed at a protruding opening end portion of the base.

3. The assembly according to claim 1, wherein more than one said resin circumferential rib is provided with the resin outer circumferential surface of the portion of the base and a plurality of the circumferential ribs is disposed at an interval in a cylinder axial direction of the base.

4. The assembly according to claim 1, wherein the one metal end portion is connected and fixed to the base by a metal screw part of the outer circumferential surface of the one metal end portion and a resin screw part of the inner circumferential surface of the base screwed to each other.

5. The assembly according to claim 1, wherein the sealant is an O-ring.

6. The assembly according to claim 1, wherein a protruding height of the base from the outer circumferential surface of the resin pipe is 1 mm or more and 30 mm or less.

7. The assembly according to claim 1, wherein the metal member has a flow path extending therethrough in the longitudinal direction thereof and the flow path is open at the leading end of the one metal end portion in the insertion direction, and the flow path and the pipe passage communicate with each other through the base flow path.

8. A method of manufacturing an assembly of a resin pipe and a metal member in which one metal end portion of the metal member is inserted in and fixed to a base having a cylindrical shape, made of resin, and protruding on an outer circumferential surface of the resin pipe at an intermediate position of the resin pipe in the longitudinal direction, wherein a base flow path extending in a protruding direction of the base is branched from an intermediate portion of a pipe passage of the resin pipe and the base flow path is open at a protruding end of the base, the method comprising:

integrally forming, as the base, a resin circumferential rib that protrudes toward an outer circumferential side and is continuous around an entire circumference in a circumferential direction on a resin outer circumferential surface of a portion of the base where the one end portion is inserted; and inserting and fixing the one metal end portion on which a sealant having an annular shape is externally fitted in and to the base to interpose the sealant between a metal outer circumferential surface of the one metal end portion and a resin inner circumferential surface of the base, allow the metal outer circumferential surface of the one metal end portion to press the sealant to restrict movement of the sealant toward an inner side in a radial direction and toward a trailing end side of the one metal end portion in an insertion direction, and allow the resin inner circumferential surface of the base to press the sealant to restrict movement of the sealant toward outer side in the radial direction and toward a leading end side of the one metal end portion in the insertion direction, wherein the one metal end portion is a shape in which a small-diameter portion on the leading end side in the insertion direction, a large-diameter portion on the trailing end side in the insertion direction, and an enlarged-diameter portion whose outer diameter gradually increases from the small-diameter portion toward the large-diameter portion are continuously connected, the base comprises a base small-diameter portion corresponding to the small-diameter portion, a base large-diameter portion corresponding to the large-diameter portion, and a base enlarged-diameter portion corresponding to the enlarged-diameter portion, and an outer circumferential surface of the enlarged-diameter portion presses the sealant to restrict movement of the sealant toward the inner side in the radial direction and toward the trailing end side of the one metal end portion in the insertion direction.

9. An assembly of a resin pipe and a metal member in which one metal end portion of the metal member is inserted in and fixed to a base having a cylindrical shape, made of resin, and protruding on an outer circumferential surface of the resin pipe at an intermediate position of the resin pipe in the pipe's longitudinal direction, the assembly comprising a base flow path extending in a protruding direction of the base being branched from an intermediate portion of a pipe passage of the resin pipe and the base flow path is configured to be open at the protruding end of the base, a sealant externally fitted to the one metal end portion, interposed between a metal outer circumferential surface of the one metal end portion and a resin inner circumferential surface of the base, and having an annular shape, the metal outer circumferential surface of the one metal end portion pressing the sealant being configured to restrict movement of the sealant toward an inner side in a radial direction and toward a trailing end side of the one metal end portion in an insertion direction, the resin inner circumferential surface of the base pressing the sealant being configured to restrict movement of the sealant toward an outer side in the radial direction and toward a leading end side of the one metal end portion in the insertion direction, a resin outer circumferential surface of a portion of the base where the one metal end portion is inserted being provided with a resin circumferential rib that protrudes toward an outer circumferential side and is continuous around an entire circumference in a circumferential direction, and at least three resin vertical ribs that protrude toward the outer circumferential side and extend in the cylinder axial direction of the base are separated at an equal interval along the circumferential direction on the resin outer circumferential surface of the portion of the base where the one metal end portion is inserted.

10. A method of manufacturing an assembly of a resin pipe and a metal member in which one metal end portion of the metal member is inserted in and fixed to a base having a cylindrical shape, made of resin, and protruding on an outer circumferential surface of the resin pipe at an intermediate position of the resin pipe in the longitudinal direction, wherein a base flow path extending in a protruding direction of the base is branched from an intermediate portion of a pipe passage of the resin pipe and the base flow path is open at a protruding end of the base, the method comprising:

integrally forming, as the base, a resin circumferential rib that protrudes toward an outer circumferential side and is continuous around an entire circumference in a circumferential direction on a resin outer circumferential surface of a portion of the base where the one end portion is inserted;

integrally forming at least three resin vertical ribs that protrude toward the outer circumferential side, extend in the cylinder axial direction of the base and are separated at an equal interval along the circumferential direction on the resin outer circumferential surface of the portion of the base where the one metal end portion is inserted; and inserting and fixing the one metal end portion on which a sealant having an annular shape is externally fitted in and to the base to interpose the sealant between a metal outer circumferential surface of the one metal end portion and a resin inner circumferential surface of the base, allow the metal outer circumferential surface of the one metal end portion to press the sealant to restrict movement of the sealant toward an inner side in a radial direction and toward a trailing end side of the one metal end portion in an insertion direction, and allow the resin inner circumferential surface of the base to press the sealant to restrict movement of the sealant toward outer side in the radial direction and toward a leading end side of the one metal end portion in the insertion direction.

* * * * *